(12) United States Patent
Miller (10) Patent No.: US 9,441,799 B2
(45) Date of Patent: Sep. 13, 2016

(54) ELECTRONIC CIRCUITS TO EXTEND BATTERY LIFE TIME

(71) Applicant: Andrew J. Miller, Albuquerque, NM (US)

(72) Inventor: Andrew J. Miller, Albuquerque, NM (US)

(*) Notice: Subject to any disclaimer, the term of this patent is extended or adjusted under 35 U.S.C. 154(b) by 0 days.

(21) Appl. No.: 14/625,368

(22) Filed: Feb. 18, 2015

(65) Prior Publication Data

US 2015/0308640 A1    Oct. 29, 2015

Related U.S. Application Data

(60) Provisional application No. 61/940,836, filed on Feb. 18, 2014.

(51) Int. Cl.
| H05B 37/00 | (2006.01) |
| F21L 4/00 | (2006.01) |
| H05B 37/02 | (2006.01) |
| H02J 7/00 | (2006.01) |
| F21V 23/04 | (2006.01) |

(52) U.S. Cl.
CPC .............. *F21L 4/005* (2013.01); *H02J 7/00* (2013.01); *H05B 37/02* (2013.01); *F21V 23/0414* (2013.01)

(58) Field of Classification Search
CPC .............................. H05B 33/08; H05B 37/02
USPC .............. 315/86, 200 A, 274, 291, 294, 362
See application file for complete search history.

(56) References Cited

U.S. PATENT DOCUMENTS

| 4,310,785 | A | * | 1/1982 | Iwata | ..................... | G03B 15/05 |
| | | | | | | 315/171 |
| 6,040,660 | A | * | 3/2000 | Schmidt | ............... | H05B 39/044 |
| | | | | | | 315/136 |
| 6,246,184 | B1 | * | 6/2001 | Salerno | ................ | H05B 39/047 |
| | | | | | | 315/200 A |
| 6,841,941 | B2 | * | 1/2005 | Kim | ........................ | F21L 4/025 |
| | | | | | | 315/86 |
| 6,952,084 | B2 | * | 10/2005 | Bruwer | .................. | H05B 37/02 |
| | | | | | | 315/200 A |
| 7,116,061 | B2 | * | 10/2006 | Kim | ........................ | F21L 4/025 |
| | | | | | | 307/112 |
| 7,214,952 | B2 | * | 5/2007 | Klipstein | ................ | F21L 4/005 |
| | | | | | | 250/365 |

* cited by examiner

*Primary Examiner* — Tung X Le
(74) *Attorney, Agent, or Firm* — Isaac Estrada; Deborah A. Peacock; Peacock Myers, P.C.

(57) ABSTRACT

A low-current battery operated apparatus with a first voltage boosting circuit for operation with depleted batteries and a second circuit for operating with non-depleted batteries, and a circuit selector switch for selectively connecting a low-current component such as an LED with the first circuit or the second circuit.

20 Claims, 10 Drawing Sheets

ELECTRONIC CIRCUITS TO EXTEND BATTERY LIFE TIME

CROSS-REFERENCE TO RELATED APPLICATIONS

This application claims priority to and the benefit of the filing of U.S. Provisional Patent Application Ser. No. 61/940,836, filed on Feb. 18, 2014, and the specification thereof is incorporated herein by reference.

BACKGROUND OF THE INVENTION

1. Field of the Invention (Technical Field)

Embodiments of the present invention relate a circuit that boosts battery voltage for low current draw devices, particularly for flashlights.

2. Description of Related Art

Over a billion people in third world countries do not have access to household electricity, resulting in a reliance on devices powered by expensive batteries. Given the average third world wage of a few dollars a day, 20-30% is spent on energy sources like batteries, creating a desperate need for improving battery lifetime. Batteries that, at a glance, are considered to be "dead" are discarded even though they still have remaining energy Embodiments of the present invention solve this problem by incorporating a "Joule Thief" circuit (which boosts battery voltage) into low current draw devices, such flashlights, cell phones, laptops, tablets, radios, battery operated toys, mp3 players, two way radios, wireless electronics like keyboards and mice, game controllers, cars, remote controllers for TV's, stereos, etc., to utilize remaining energy in batteries that are otherwise considered "dead" when used in these devices, thus extending battery life. For instance, conventional light-emitting-diodes (LED) flashlights, such as those commercially sold in department stores and on the Internet, most often require anywhere from one to six AAA, AA, C, or D size batteries for proper function, and comprise of one or more LEDs lights that provide illumination when the flashlight is turned on. A common flashlight provides useful illumination from the battery source until the batteries become discharged to a point that the amount of illumination is no longer useful and the batteries are either replaced or recharged. There is a need for devices that can utilize the energy that remains in the batteries.

Embodiments of the invention use a simple and inexpensive circuit, which can be incorporated into low current draw devices, allowing the remaining energy in a "dead" battery to be used. This type of circuit takes a low voltage source ("dead" batteries), steps it up to a higher voltage using a toroid as an inductor (similar in function to a step up transformer) and then rapidly discharges a voltage pulse to the component of the device needing power, doing this several hundred to several hundred thousand times a second by using the transistor as a fast switch. While the circuit is turning on and off very rapidly, it appears as if the device is continually on. By stepping up the voltage from a "dead" battery, the user can drain the last amount of energy from it and use it to power the device. This is energy which would otherwise be wasted. Embodiments of the invention for optimized Joule Thief circuit designs cost pennies to retrofit in current devices when produced in bulk, paying for themselves in the first set of batteries. In one embodiment, a voltage sensing circuit is added that automatically senses when the battery source voltage drops below a useful value, and automatically engages a voltage increasing electronic circuit. Embodiments of the invention do not only significantly reduce energy costs for people in third world countries, they reduce battery landfill pollution through the extension of battery life.

BRIEF SUMMARY OF THE INVENTION

Embodiments of the invention comprise a battery operated flashlight comprising a light emitting component, one or more batteries, a first circuit for operation of the light emitting component with non-depleted batteries, a second circuit for operation of the light emitting component with depleted batteries, the second circuit comprising a transistor, the transistor comprising a base, a collector, and an emitter, the second circuit comprising a first wire and a second wire, the first and the second wires wrapped around a ferrite core, a resistor connecting the first wire and the second wire in series with one another, the first wire connecting the base of the transistor to the resistor, the second wire connecting the collector of the transistor to the resistor, and a circuit selector switch for selectively connecting the light emitting component with the first circuit or the second circuit. In one embodiment, in the battery operated flashlight, the second wire wraps around the ferrite core between 1 and 15 times. In one embodiment, the second wire wraps around the ferrite between 2 and 10 times. In one embodiment, the second wire wraps around the ferrite between 3 and 7 times. In one embodiment, the light emitting component comprises one or more light emitting diodes. In one embodiment, the transistor is an NPN 2N2222 transistor. In one embodiment, the resistor has a resistance of about 1 k$\Omega$. In one embodiment, the ferrite core comprises a toroid shape. In one embodiment, the ferrite core comprises an inductance of about 100 microhenries or higher. In one embodiment, the circuit selector switch comprises a third circuit which automatically senses voltage of batteries and selectively switches between said first or said second circuit based on a predetermined voltage. In one embodiment, the third circuit comprises a solid state relay. In one embodiment, the solid state relay comprises an LCC120 chip.

Embodiments of the present invention further comprise an electrical circuit comprising: an electrical load, one or more batteries, a first circuit for operation of the load with non-depleted batteries, a second circuit for operation of the load with depleted batteries, the second circuit comprising a transistor, the transistor comprising a base, a collector, and an emitter; the second circuit comprising a first wire and a second wire, the first and the second wires wrapped around a ferrite core, a resistor connecting the first wire and the second wire in series with one another, the first wire connecting the base of the transistor to the resistor, the second wire connecting the collector of the transistor to the resistor; and a circuit selector switch for selectively connecting the load with the first circuit or the second circuit. In one embodiment the circuit selector switch comprises a third circuit which automatically senses voltage of batteries and selectively switches between the first or the second circuit based on a predetermined voltage. In one embodiment, the third circuit comprises a solid state relay. In one embodiment, the solid state relay comprises an LCC120 chip. In one embodiment, the second wire wraps around the ferrite between 3 and 7 times. In one embodiment, the ferrite core comprises a toroid shape. In one embodiment, the ferrite core comprises an inductance of about 100 microhenries or higher. In one embodiment, the resistor has a resistance of about 1 k$\Omega$.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

In the following detailed description, numerous specific details are set forth in order to provide a thorough understanding of the embodiments of the invention. However, upon studying this application, it will be understood by one of ordinary skill in the art that the embodiments may be practiced without these specific details. For instance, well known operation or techniques may not be shown in detail. Technical and scientific terms used in this description have the same meaning as commonly understood to one or ordinary skill in the art to which this subject matter belongs.

As used throughout this application, the term "non-depleted batteries" is intended to include one or more batteries which contain sufficient energy to power a desired component without use of a voltage-increasing circuit. As used throughout this application the term "depleted batteries" is intended to include one or more batteries which do not contain sufficient energy to power a desired component unless a voltage-increasing circuit, such as those of the embodiments of the present invention are used.

Figure 1:
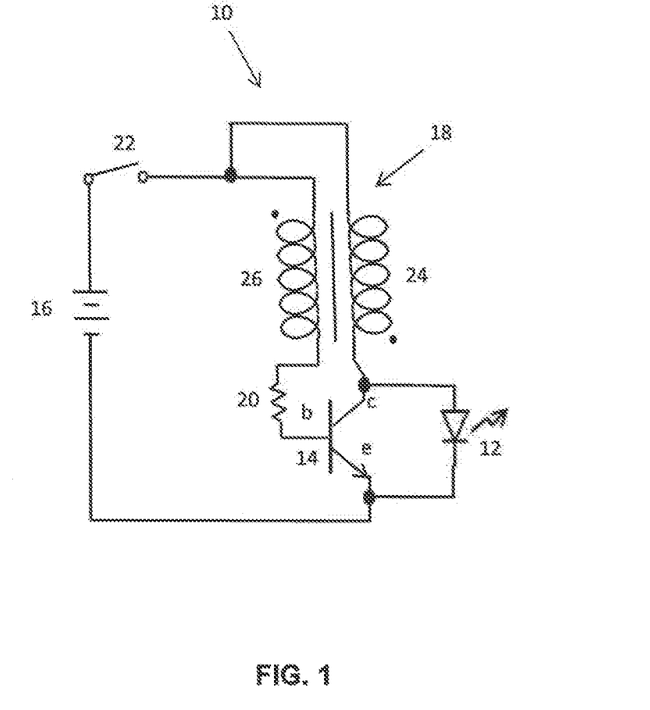
FIG. 1 is a view of the voltage increasing electronic circuit without the flashlight housing.

Referring now to the figures, and more particularly to FIG. 1, in one embodiment, electronic circuit 10 comprises component 12, which preferably is a component of a low current draw device, the performance of which is not affected by very rapid pulsing of power, for example, an LED of any number, type, color or configuration of light source that provides illumination. Preferably, electronic circuit 10 also comprises bipolar junction transistor 14 and battery source 16. In a preferred embodiment, electronic circuit 10 further comprises ferrite toroid 18 with wire wrapped around it, resistor 20, and switch 22. Although ferrite toroid 18 is preferably used, other shapes of ferrite cores can also be used In one embodiment, when switch 22 is turned on, voltage increasing electronic circuit 10 is activated and the voltage from battery source 16 is increased. If battery source 16 includes weak or "dead" batteries, battery source 16 can still be used to power component 12 as a result of the building up of a magnetic field in ferrite toroid 18. Preferably, when ferrite toroid 18 becomes saturated with energy, bipolar junction transistor 14 is used as a fast switch, shutting off and collapsing the magnetic field, which results in an increased voltage that will momentarily power component 12. This entire event may occur at rates greater than a hundred kilohertz. If, for example, component 12 is an LED light source, it will blink on and off at a rate so fast, that it cannot be detected by the human eye. Thus, to a user of a flashlight operating with this circuit, it would appear as if the device is performing normally.

Figure 2:
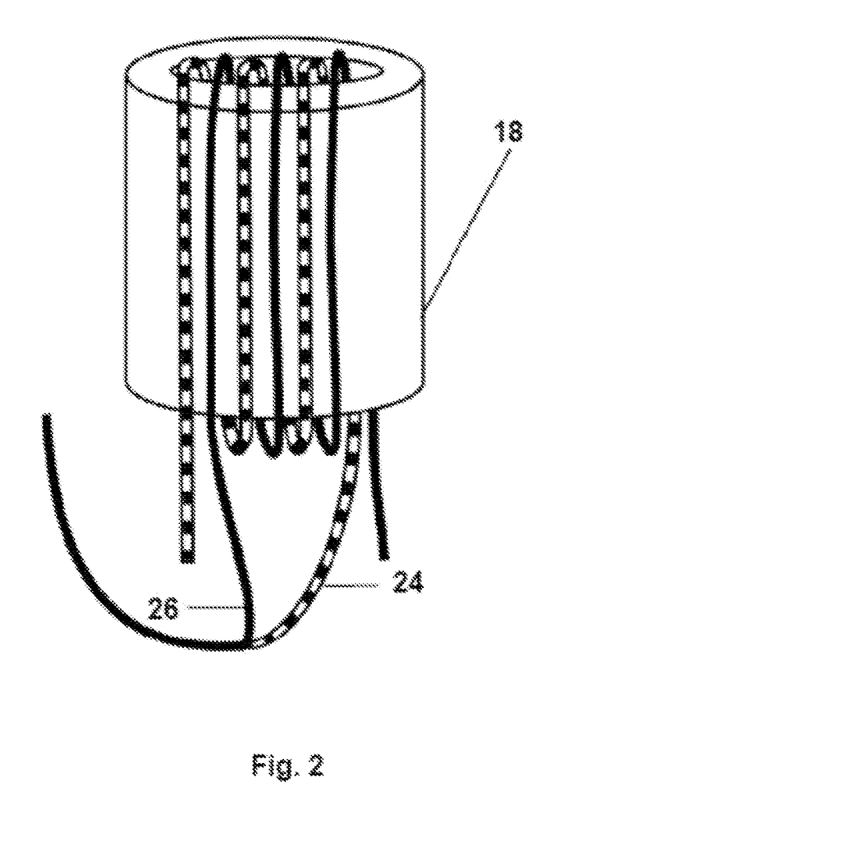
FIG. 2 is a close-up drawing of the ferrite toroid with wire wrapped around it.

Referring now to FIG. 2, there is shown a close-up diagram of ferrite toroid 18 with two different wires wrapped around it. Wire 24 is shown with dash marks to distinguish it from wire 26, which is shown as a plain black wire. The ends of the wires 24 and 26 are joined and they parallel each other as they wrap around ferrite toroid 18 so that they can oppose one another in terms of conventional current flow, which allows the magnetic field in ferrite toroid 18 to build up and then quickly collapse, generating enough voltage to power component 12, even if the voltage of battery source 16 is too low to power component 12 under normal conditions. Preferably wires 24 and 26 wind around ferrite toroid 18 between approximately 1 and approximately 15 times; more preferably between approximately 2 and approximately 10 times; and most preferably, between approximately 3 and approximately 7 times.

Preferably, resistor 20 is disposed between ferrite toroid 18 and bipolar junction transistor 14. In a preferred embodiment, resistor 20 is preferably about one thousand ohms and switch 22 is preferably a single pole double throw switch disposed in a suitable location, for example, between battery source 16 and ferrite toroid 18.

Figure 3:
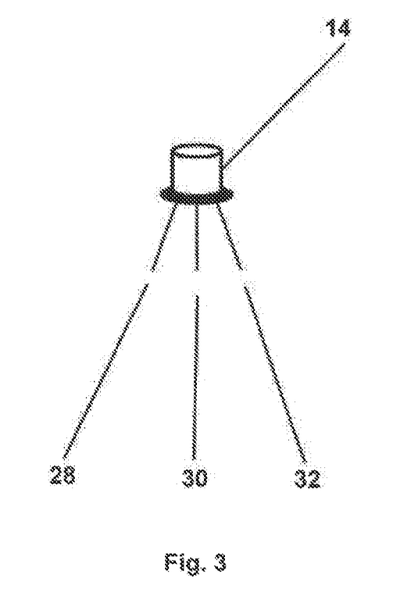
FIG. 3 is a close-up view of the bipolar junction transistor.

Referring now to FIG. 3, there is shown a close-up view of bipolar junction transistor 14, which preferably comprises collector 28, shown on the left, base 30, shown in the middle, and emitter 32, shown on the right. In a preferred embodiment, collector 28, base 30, and emitter 32 are preferably connected as shown in FIGS. 1 and 3 for electronic circuit 10 to perform effectively.

Preferably the components in a given device are of a certain type or range of types in order for an embodiment of voltage increasing electronic circuit to work. For instance, in an LED light source, its voltage requirements must be matched to the battery source (e.g., three volts is common).

Furthermore, a bipolar junction transistor must be able to handle the voltage and switching requirements of the voltage increasing electronic circuit. A typical transistor that works well is, for example, the NPN 2N2222. Furthermore, a ferrite toroid should have sufficient inductance (e.g., about 100 microhenries or higher) to generate a strong enough magnetic field. As is with most electronic circuits, component values can be changed within a certain range and still work. The values stated here are such that the voltage increasing electronic circuit can be built and will work, but optimizing the circuit to maximize battery life will result in different values for different loads and in different applications.

Figure 4:
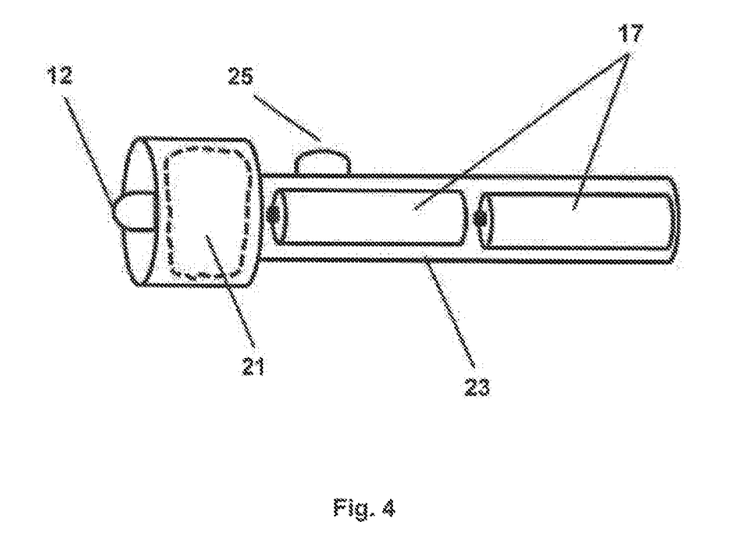
FIG. 4 is a perspective view of the flashlight with the voltage increasing electronic circuit inside.

Referring to FIG. 4, in one embodiment, electronic circuit 10 is disposed in area 21 of a flashlight comprising batteries 17 in housing 23, and on/off switch 25. Electronic circuit 10 (FIG. 10) is very inexpensive and can easily be produced for just a few pennies in large quantities.

Because electronic circuit 10 has resistance, which consumes battery energy, it is preferably not engaged in the device until the batteries appear to be dead. In one embodiment, a voltage sensing circuit is added that automatically senses when the battery source voltage drops below a useful value, and automatically engages a voltage increasing electronic circuit, such as electronic circuit 10. In one embodiment, the additional circuit also turns off the device when the voltage from the voltage increasing electronic circuit 10 is no longer enough to power a given component, for example component 12. Some example include, but are not limited to, (1) a microcontroller that can be programmed to turn on a particular circuit at a certain voltage; (2) a silicon controlled rectifier (SCR) configuration of transistors to act as a sort of solid state relay to allow current through one path at high voltage, and then current through another path at the lower voltage; (3) a low voltage relay switch that runs a device such as a flashlight normally at high voltage or trigger and run only the Joule Thief at lower voltage; (4) a comparator chip used with several resistors and diodes to switch circuit paths based on of the voltage; or (5) a simple battery-tester-circuit set up that powers either the LED normally or the Joule Thief depending on the voltage of the battery, etc.

Figure 9:
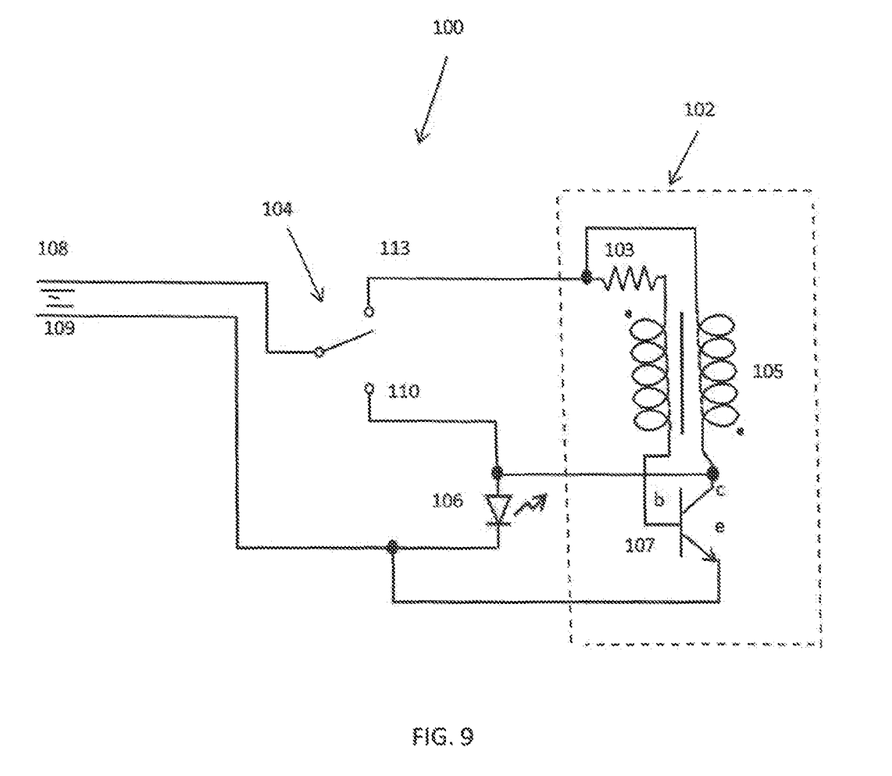
FIG. 9 is a wiring that illustrates an embodiment of a circuit that is capable of integrating diverse switches with a voltage boosting circuit.

FIG. 9 is a schematic of circuit 100, which is capable of integrating diverse switches such as, but not limited to, those in examples (1) through (5) above. Circuit 100 preferably comprises voltage boosting circuit 102, which is connected to a single pole double throw switch 104 (of any type and/or controlled by any device) to power a low-power component, for example LED 106. Preferably, voltage boosting circuit 102 comprises resistor 103, inductor 105, and bipolar junction transistor 107, and all these elements are coupled as shown. In operation, the combined circuits receive one positive input 108 and one negative input 109 by connecting them to positive and negative terminals or a battery respectively. Preferably, switch 104 is adjusted to have one circuit path closed at a time based on the positive input with reference to the negative input. If, for example, the positive input voltage is above the chosen level, normally-open circuit path 110 becomes closed, allowing LED 106 or other low power electronic device to be powered by a voltage source (not shown), and not by voltage boosting circuit 102. If, for example, the positive input voltage is below a given chosen level, normally-closed circuit path 113 is then completed allowing LED 106 or other electronic device to be powered by use of voltage boosting circuit 102 and not through normally-open circuit path 110. The chosen voltage level that switch 104 is to toggle at is set to be the voltage at which normally-open circuit path 110 will be closed based on the design of the switch.

Figure 10:
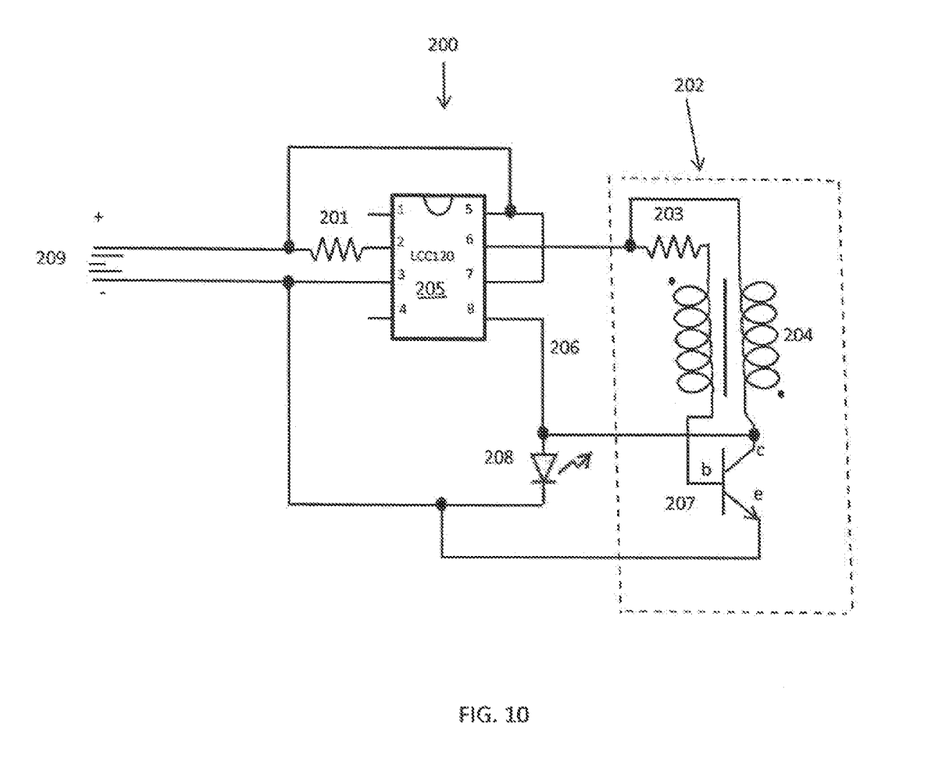
FIG. 10 is a wiring of an embodiment of the invention for a circuit comprising an LCC120 single pole double throw solid state relay and a voltage boosting circuit.

Referring to the wire diagram of FIG. 10, in one embodiment, a single pole double throw switch is created through, for example, circuit 200, which preferably comprises voltage boosting circuit 202, and is preferably further configured to include additional resistor 201 and LCC120 chip 205, which is a solid state relay. Together, circuits 200 and 202 can be connected to one or more batteries 209 in order to power, for example, LED 208, or another low power electronic device. Preferably, voltage boosting circuit 202 comprises resistor 203, inductor 204, and bipolar junction transistor 207, and all these elements are coupled as shown.

LCC120 chip 205 requires about 10 mA for normally-open path 206 to be completed (the path that runs the LED directly off of battery 209). The switching voltage level is set by the resistance connected to pin 2 of LCC120 chip 205. With a higher resistance the switch will only connects normally-open path 206 when the voltage is higher, and likewise if the resistance is lower the chip will connect the normally-open path 206 at a lower voltage. Thus, based on the desired switching voltage level, a corresponding resistance value may be selected to set LCC120 chip 205 to toggle around that voltage. Circuit 200 will then power LED 208 (or other electronic device) directly by the input voltages if the voltage is above a given chosen voltage, and if the input voltage drops below the chosen voltage LCC120 chip 205 will toggle and power LED 208 (or other electronic device) only with voltage boosting circuit 202.

Figure 11:
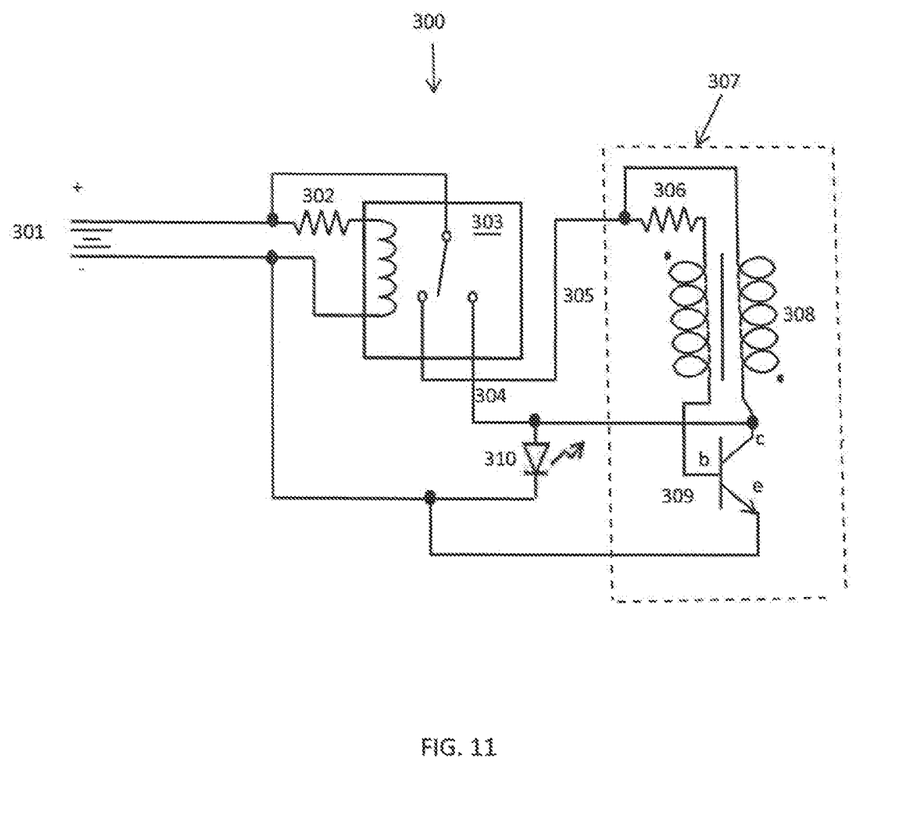
FIG. 11 is a schematic for an embodiment of the invention for a circuit comprising a single pole double throw solid state relay and a voltage boosting circuit.

Referring to FIG. 11 (a schematic diagram of the switch and voltage boosting circuit), in one embodiment, single pole double throw solid-state relay 303 is provided in circuit 300, which is preferably connected to voltage boosting circuit 307, and is preferably further configured to include additional resistor 302, and one or more batteries 301 to power LED 310, or another low power electronic device. Preferably, voltage boosting circuit 307 comprises resistor 306, inductor 308, and bipolar junction transistor 309, with all these elements being coupled as shown.

Preferably, solid state relay 303 may be of any type and is designed to activate the normally-open path 304 or normally-closed path 305 at the desired voltages. The switching voltage level is set by the resistor 302 connected to solid-state relay 303. With a higher resistance, the solid-state relay 303 will only connect the normally-open path 304 when the voltage is higher, and likewise if the resistance is lower the solid-state relay 303 will connect the normally-open path 304 at a lower voltage. Thus, based on the desired switching voltage level a corresponding resistance value may be selected to set solid-state relay 303 to toggle around that voltage. Circuit 300 will then power LED 310 (or other electronic device) directly by the input voltage of battery 301 if the voltage is above a given chosen voltage, and if the input voltage drops below the chosen voltage, solid-state relay 303 will toggle and power LED 310 (or other electronic device) only with voltage boosting circuit 307.

INDUSTRIAL APPLICABILITY

The invention is further illustrated by the following non-limiting example.

EXAMPLE 1

A battery-operated LED flashlight was built incorporating the electronic circuit of FIG. 1. Referring to Table 1 below, experiments were conducted to find the ideal number of windings around the toroid of an electronic circuit according to embodiments of the invention to maximize battery efficiency in the flashlight. This was done by testing from 1 to 15 windings and recording the Lux produced for optimum (low voltage, low current) operation. These experiments showed that five windings provided the best balance of intensity produced versus energy used.

TABLE 1

| All tests at 1 in and 1.7 V | Lux produced: |
| --- | --- |
| 1 winding | 0.0 |
| 2 windings | ~30.0 |
| 3 windings | 1453.2 |
| 4 windings | 1128.4 |
| 5 windings | 773.8 |
| 6 windings | 614.9 |
| 7 windings | 145.3 |
| 8 windings | 346.7 |
| 9 windings | 357.8 |
| 10 windings | 488.2 |
| 11 windings | 106.4 |
| 12 windings | 325.9 |
| 13 windings | 437.6 |
| 14 windings | 210.1 |
| 15 windings | 208.5 |

Referring to Table 2 below, further experiments were conducted to identify the optimum resistance of the resistor in the electronic circuit. The electronic circuit was connected to a pair of AA batteries with voltage limited by a precision potentiometer. Resistances from 100 ohms to 2.2 kΩ were tested. The voltage needed to produce 50 lux with each resister in the circuit was then recorded and the results were recorded to find the best resistance for the circuit (a balance of current draw and reliable operating range). These experiments showed that while resistors between 100 ohms and 2.2 kΩ worked well with the electronic circuit, a resistance of about 1 kΩ balances the ability to run at low voltages and not drain the remaining current too rapidly.

TABLE 2

| ohms | voltage |
| --- | --- |
| 100 | 0.78 |
| 120 | 0.827 |
| 150 | 0.851 |
| 180 | 0.883 |
| 220 | 0.849 |
| 270 | 0.821 |
| 330 | 0.843 |
| 390 | 0.876 |
| 470 | 0.897 |
| 560 | 0.904 |
| 680 | 0.918 |
| 820 | 0.921 |
| 1k | 1.002 |
| 1.2k | 1.245 |
| 1.5k | 1.453 |
| 1.8k | 1.842 |
| 2.2k | 2.136 |

Figure 5:
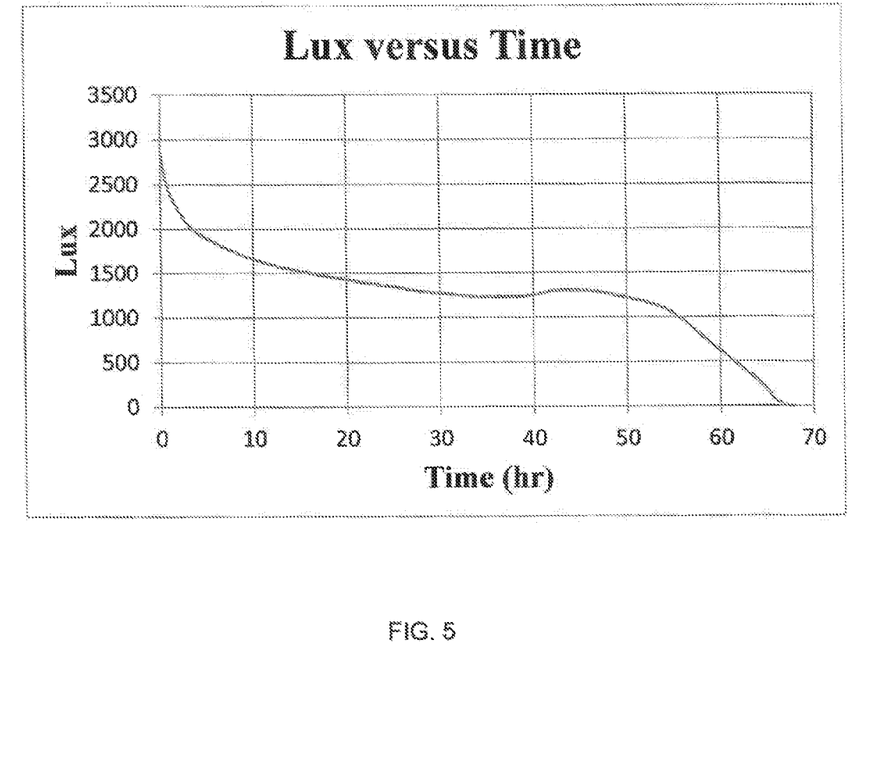
FIG. 5 is a Lux vs. Time graph with the results of experiments that were conducted to test the life of batteries in an ordinary flashlight.
Figure 6:
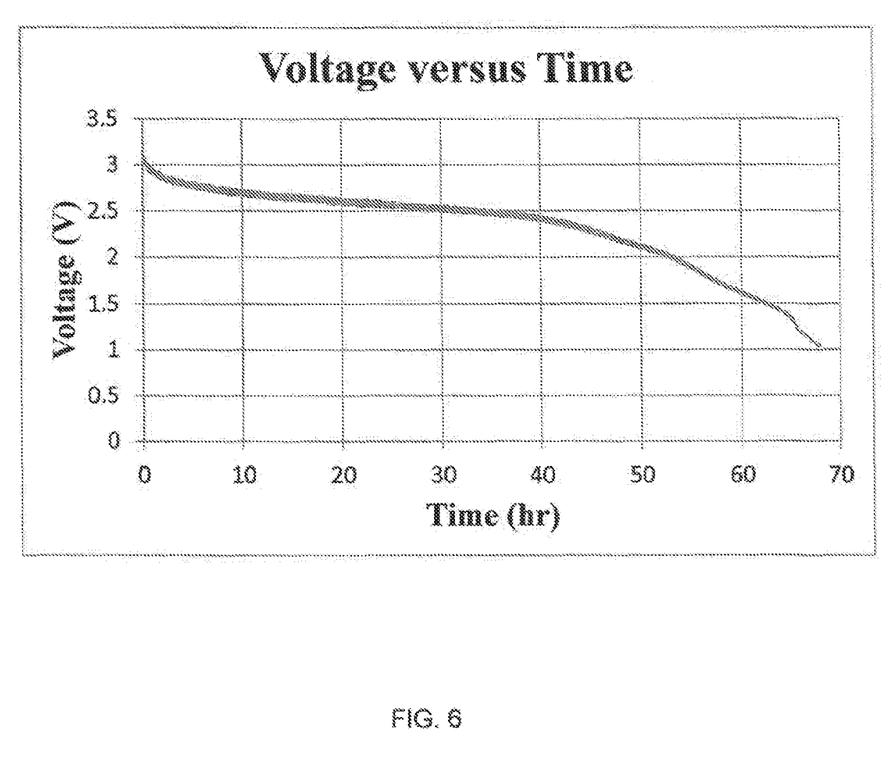
FIG. 6 is a graph of the results of experiments that tested the life of batteries in an ordinary flashlight.

In addition, Experiments were conducted to collect data of voltage decay versus illumination decay utilizing two new AA batteries in a regular flashlight. The voltage and illumination were measured using a Vernier Lab Quest data logger with a calibrated illumination sensor and voltage probe to measure the light output by the LED and the voltage across the positive and negative input of the LED. The graphs in FIGS. 5 and 6 show the time versus lux and time versus voltage of the regular flashlight respectively.

Figure 7:
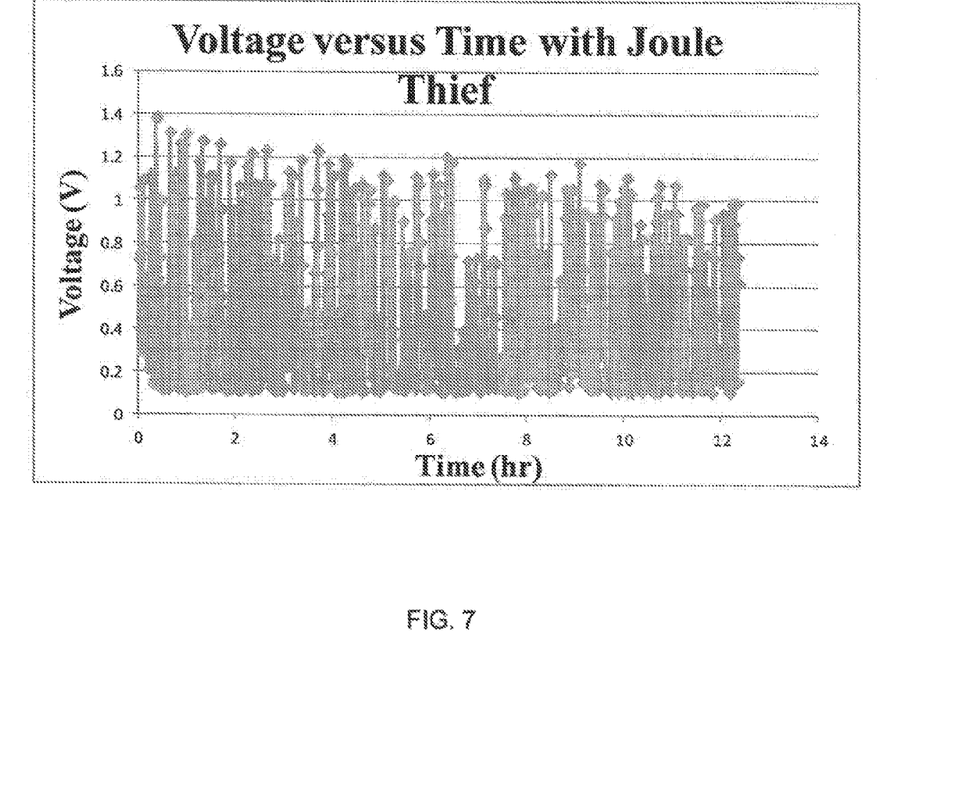
FIG. 7 shows the results of experiments that were performed to assess Voltage versus time using an embodiment of the present invention.

Additional experiments demonstrated that an electronic circuit embodiment of the present invention requires a minimum of 1.2 volts to produce 50 lux in the LED flashlight, and that the total time of usable light provided to be about 67 hours, using this minimum voltage level. See FIG. 7.

Figure 8:
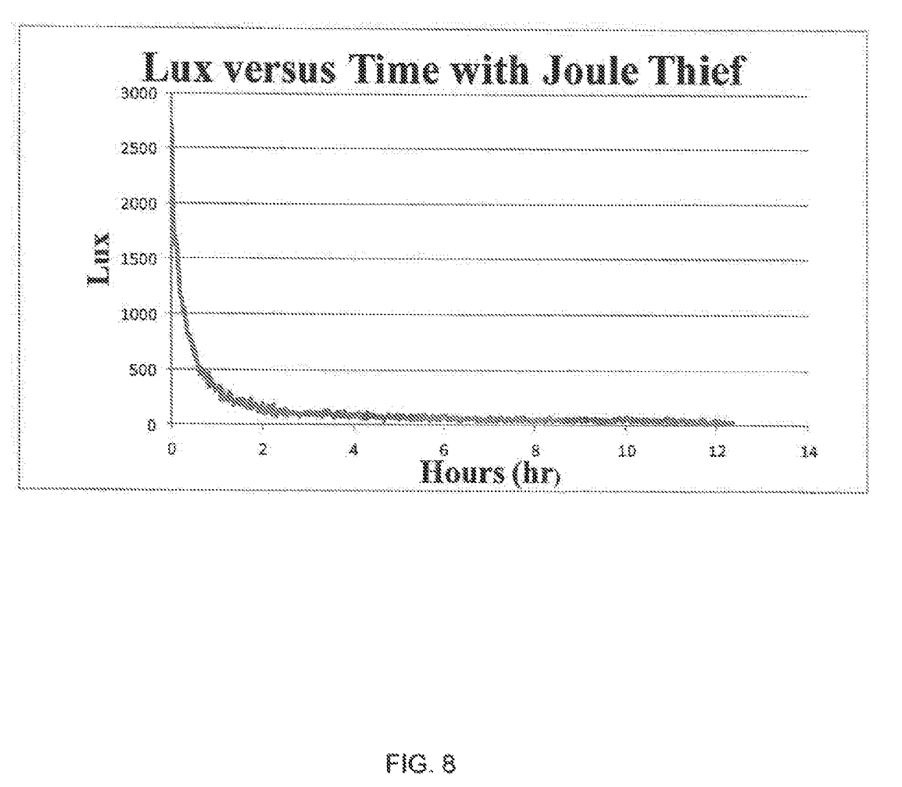
FIG. 8 is a graph that illustrates the results of experiments that were performed to test the life of batteries in a flashlight incorporating an embodiment of the present invention for an electronic circuit.

Additional experiments were conducted to determine additional battery life for the flashlight containing an embodiment of an optimized electronic circuit. This was done using the Vernier Lab Quest to measure voltage and illumination of the flashlight under low voltage ("dead" battery) conditions. This involved testing the flashlight comprising the embodiment of the electronic circuit from the starting voltage when the normal flashlight is too weak, to the point at which the optimized electronic circuit can no longer produce 50 lux using the "dead" batteries. These experiments showed that the extra battery life the embodiment of electronic circuit provided was approximately 16%, or 11 hours. See FIG. 8.

The preceding example can be repeated with similar success by substituting the generically or specifically described components and/or operating parameters of this invention for those used in the preceding examples. Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A flashlight comprising:
a light emitting component;
one or more batteries;
a first circuit for operation of said light emitting component with non-depleted batteries;
a second circuit for operation of said light emitting component with depleted batteries;
said second circuit comprising a transistor, said transistor comprising a base, a collector, and an emitter;
said second circuit comprising a first wire and a second wire;
said first and said second wires wrapped around a ferrite core;
a resistor connecting said first wire and said second wire in series with one another;
said first wire connecting said base of said transistor to said resistor;
said second wire connecting said collector of said transistor to said resistor; and
a circuit selector switch for selectively connecting said light emitting component with said first circuit or said second circuit.

2. The flashlight of claim 1, wherein said second wire wraps around said ferrite core between 1 and 15 times.

3. The flashlight of claim 2, wherein said second wire wraps around said ferrite between 2 and 10 times.

4. The flashlight of claim 3, wherein said second wire wraps around said ferrite between 3 and 7 times.

5. The flashlight of claim 1, wherein said light emitting component comprises one or more light emitting diodes.

6. The flashlight of claim 1, wherein said transistor is an NPN 2N2222 transistor.

7. The flashlightof claim 1, wherein said resistor has a resistance of about 1 kΩ.

8. The flashlight of claim 1, wherein said ferrite core comprises a toroid shape.

9. The flashlight of claim 1, wherein said ferrite core comprises an inductance of about 100 microhenries or higher.

10. The flashlight of claim 1, wherein said circuit selector switch comprises a third circuit which automatically senses voltage of batteries and selectively switches between said first or said second circuit based on a predetermined voltage.

11. The flashlight of claim 10, wherein said third circuit comprises a solid state relay.

12. The flashlight of claim 11, wherein said solid state relay comprises an LCC120 chip.

13. An electrical circuit comprising:
an electrical load;
one or more batteries;
a first circuit for operation of said load with non-depleted batteries;
a second circuit for operation of said load with depleted batteries;
said second circuit comprising a transistor, said transistor comprising a base, a collector, and an emitter;
said second circuit comprising a first wire and a second wire;
said first and said second wires wrapped around a ferrite core;
a resistor connecting said first wire and said second wire in series with one another;
said first wire connecting said base of said transistor to said resistor;
said second wire connecting said collector of said transistor to said resistor; and
a circuit selector switch for selectively connecting said load with said first circuit or said second circuit.

14. The electrical circuit of claim 13, wherein said circuit selector switch comprises a third circuit which automatically senses voltage of batteries and selectively switches between said first or said second circuit based on a predetermined voltage.

15. The electrical circuit of claim 14, wherein said third circuit comprises a solid state relay.

16. The electrical circuit of claim 15, wherein said solid state relay comprises an LCC120 chip.

17. The electrical circuit of claim 13, wherein said second wire wraps around said ferrite between 3 and 7 times.

18. The electrical circuit of claim 13, wherein said ferrite core comprises a toroid shape.

19. The electrical circuit of claim 13, wherein said ferrite core comprises an inductance of about 100 microhenries or higher.

20. The electrical circuit of claim 13, wherein said resistor has a resistance of about 1 kΩ.

* * * * *